No. 677,909. Patented July 9, 1901.
J. J. WOOD.
CONSTRUCTION OF ELECTRIC MOTORS.
(Application filed Apr. 23, 1900.)
(No Model.)
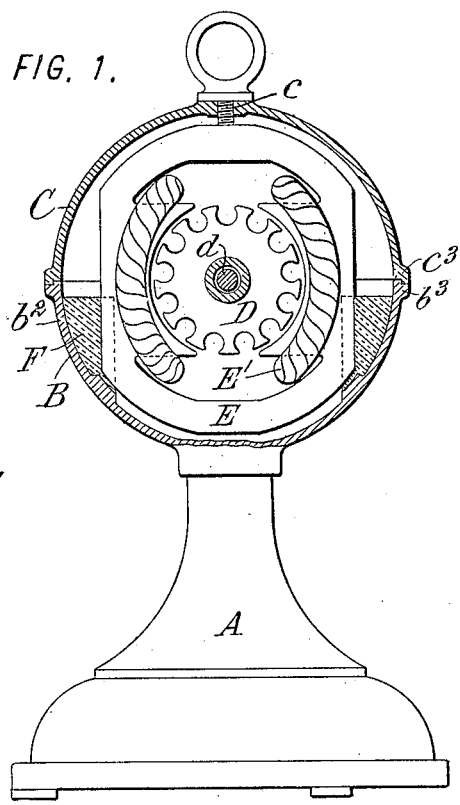
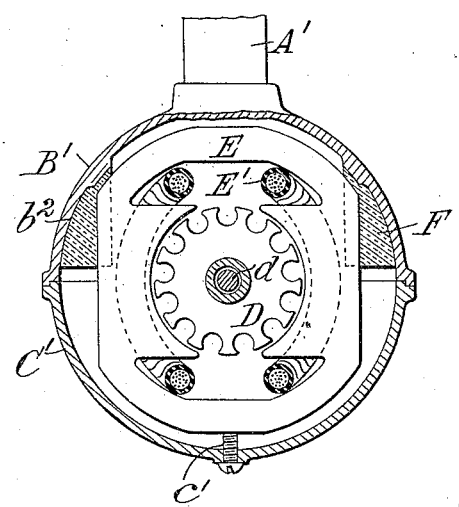
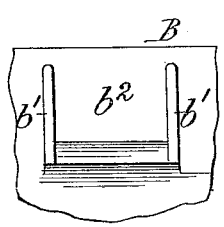
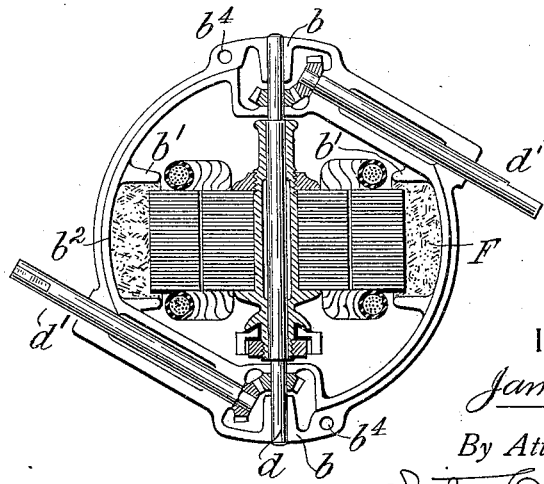
WITNESSES:
INVENTOR:
James J. Wood,
By Attorneys,

UNITED STATES PATENT OFFICE.

JAMES J. WOOD, OF FORT WAYNE, INDIANA.

CONSTRUCTION OF ELECTRIC MOTORS.

SPECIFICATION forming part of Letters Patent No. 677,909, dated July 9, 1901.

Application filed April 23, 1900. Serial No. 13,897. (No model.)

*To all whom it may concern:*

Be it known that I, JAMES J. WOOD, a citizen of the United States, residing at Fort Wayne, in the county of Allen and State of Indiana, have invented certain new and useful Improvements in the Construction of Electric Motors, of which the following is a specification.

My invention provides a novel means for mounting a motor upon or within a support or casing so that the armature may be accurately centered within the field-magnet.

My invention is of special value wherever fixed bearings are provided for the motor-shaft, so that the field-magnet must be adjusted relatively to a fixed position of the armature.

I will describe my invention as applied to motors for desk and suspended fans.

Referring to the drawings, Figure 1 is a vertical mid-section of a motor for a desk-fan. Fig. 2 is a horizontal mid-section of the motor shown in Fig. 1. Fig. 3 is a detail showing the pocket in the casing before mounting the motor in place, and Fig. 4 is a vertical section of a suspended-fan motor embodying my present invention.

A is any suitable support which is adapted to rest upon a horizontal surface and is formed with a hollow interior, which is utilized as a casing for the terminals and other stationary parts of the device. The casing proper is formed of separable casing members—such, for example, as two hollow hemispherical shells B C, fixed together by bolts or otherwise.

The motor is of any suitable type, that shown comprising the armature D, rotating in a relatively stationary field, and the field-magnet comprising a frame E and coils E'. The shaft $d$ of the armature rotates in suitable bearings $b$, formed in the shells B and C. The shells are flanged at their meeting edges, as shown at $b^3 c^3$, and rabbeted, so that one fits over the other. They are held together by screws or bolts passing through holes $b^4$, Fig. 2, thus completely and tightly inclosing the motor.

The motor shown is arranged to operate a pair of shafts $d'$, geared to the armature-shaft and adapted to carry fans at their ends.

The exact mode of practicing my invention depends to an extent upon the relative construction of the support or casing and the field-magnet frame.

In the construction shown in Figs. 1 to 3 the armature is supported by the lower shell B. As shown, this shell is cast on each side with two vertical lugs or webs $b'$, forming with the casing a pocket $b^2$ and being oppositely arranged and so spaced apart that the field-magnet frame E extends partially within the spaces between each pair of lugs. Preferably the armature is temporarily centered in some convenient way within the field-magnet frame—as, for instance, by wrapping the armature in paper until it fits precisely within the frame. The armature and frame are then placed within the shell B so that the shaft of the armature rests in the bearings $b$. A suitable material in a fluid or semifluid state is then run or filled in between the lugs $b'$, the wall of the shell B, and the magnet-frame, as shown at F, and allowed to harden therein, thus rigidly fixing the frame in its proper position. When this is done, the paper may be withdrawn from between the armature and the frame, leaving the armature precisely centered within its field-magnet. Any suitable filling material may be employed which is capable of setting at the ordinary temperature; but I prefer to use Babbitt metal, which is cast in between the shell and the frame, as I have found that in practice good results are obtained by its use. To avoid any possibility of the frame jarring free from its mounting, the upper shell C may carry a set-screw $c$, which passes through the shell and engages the upper face of the magnet-frame, as seen in Fig. 1.

In Fig. 4 I have shown my invention as applied to a suspended motor. The construction is similar to that of Figs. 1 to 3, the lugs retaining the Babbitt metal or the like being in the upper shell B' of the casing and the set-screw $c'$ in the lower shell C'. The motor is mounted in the frame in the same way as for the desk-fan, the shell B' of course being inverted. A' is the support, attached overhead. The motor is identical with that of Figs. 1 and 2. My invention thus provides means in a single casing member for mounting and rigidly fixing the entire field-magnet frame in its final position without regard to the remaining member or members of the casing. I am thus enabled to subsequently add other casing members so arranged as to completely inclose the motor in the casing—a matter which would be obviously impossible if all the casing members were required to be in position in order to determine the final position of the parts of the motor.

Though I have described one form of my invention in detail and its application to a single type of motors, many modifications and adaptations thereof to other motors without departure from my invention will readily suggest themselves to those skilled in the art to which the invention pertains.

I claim as my invention the following-defined novel features, substantially as hereinbefore specified, namely:

1. The combination with a motor-casing, of a field-magnet frame, said casing being composed of a plurality of separable members and the entire field-magnet frame being fixed in one of said casing members by a support of material hardened between said frame and said casing member.

2. The combination with a motor-casing, of a field-magnet frame, said casing surrounding and completely inclosing the motor and being composed of a plurality of members, and the entire field-magnet frame being fixed in one of said casing members by a support of material hardened between said frame and said casing member.

3. The combination with a motor-casing, of a field-magnet frame, said casing being composed of two separable shells surrounding and completely inclosing the motor, and the entire field-magnet frame being fixed in one of said shells by a support of material hardened between said frame and said shell.

In witness whereof I have hereunto signed my name in the presence of two subscribing witnesses.

JAMES J. WOOD.

Witnesses:
  A. L. HADLEY,
  N. N. KING.